United States Patent [19]

Dreier

[11] 4,024,967
[45] May 24, 1977

[54] STACK FORMER

[76] Inventor: Melvin E. Dreier, Dumont, Iowa 50625

[22] Filed: May 20, 1976

[21] Appl. No.: 688,290

[52] U.S. Cl. .................................. 214/9; 130/20; 280/42; 56/344
[51] Int. Cl.² ........................................ B65G 57/00
[58] Field of Search .............. 280/42, 656; 56/344; 130/20; 214/9

[56] References Cited

UNITED STATES PATENTS

| | | | |
|---|---|---|---|
| 611,675 | 10/1898 | Brookmeyer | 280/42 |
| 3,135,267 | 6/1964 | Liebig | 214/9 X |
| 3,837,506 | 9/1974 | Dreier | 214/9 |

Primary Examiner—Frank E. Werner
Attorney, Agent, or Firm—Morton S. Adler

[57] ABSTRACT

A towable wheel mounted frame structure for receiving blown roughage materials such as corn and hay silage, dry hay, corn stalks and the like serves as a form to create a stack of silage formed directly on the ground. The frame is hydraulically foldable into an efficiently compact form for transportation through gates and over bridges and roads and is hydraulically expandable to provide relatively wide, outwardly sloping closed sides with an open bottom and open ends for stacking operation. A separate frame associated foldable closed top is cable operated between the contracted and expanded positions of the frame and hingedly arranged frame supported baffle sections are movable from closed position for road travel to stack forming position where they form an enlarged baffle depending from the top of the expanded frame between the sides to intercept blown roughage and cause it to fill the confined area of the former.

10 Claims, 11 Drawing Figures

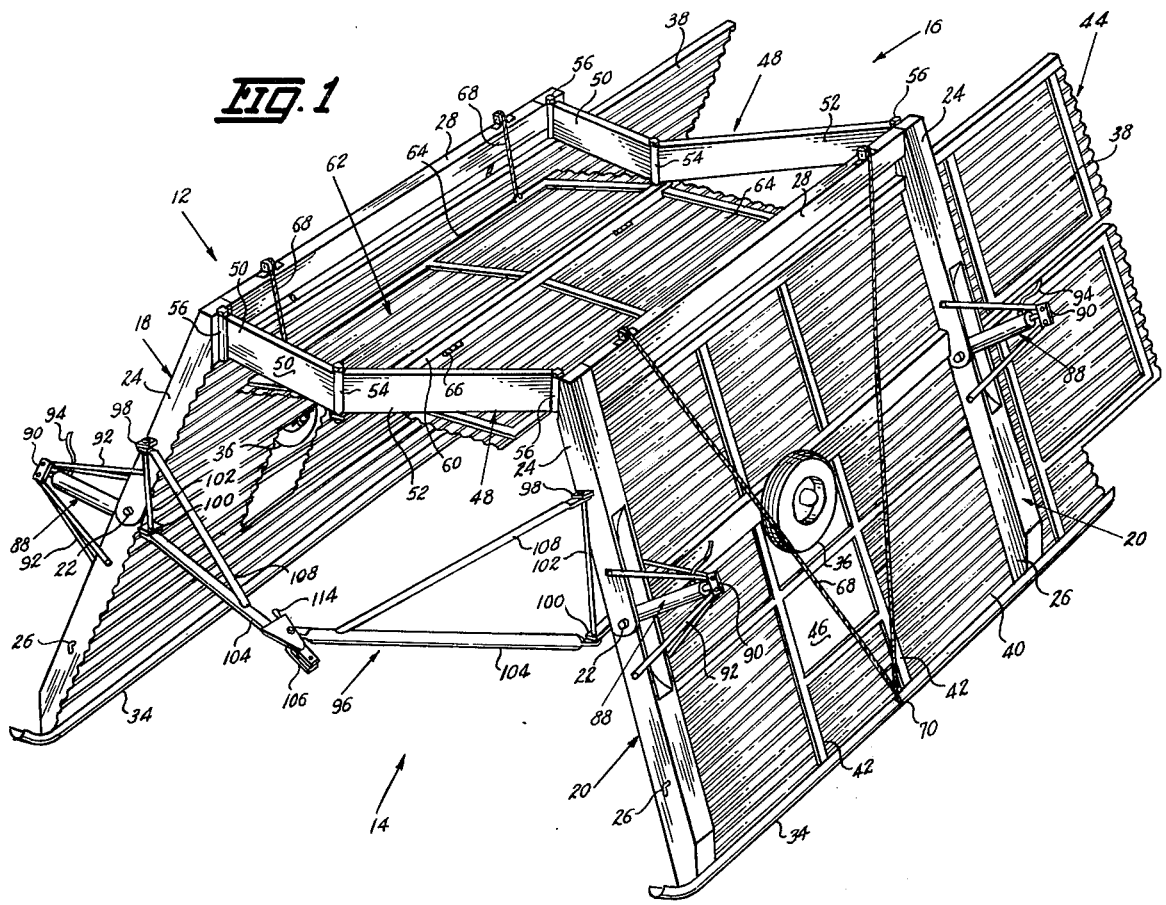
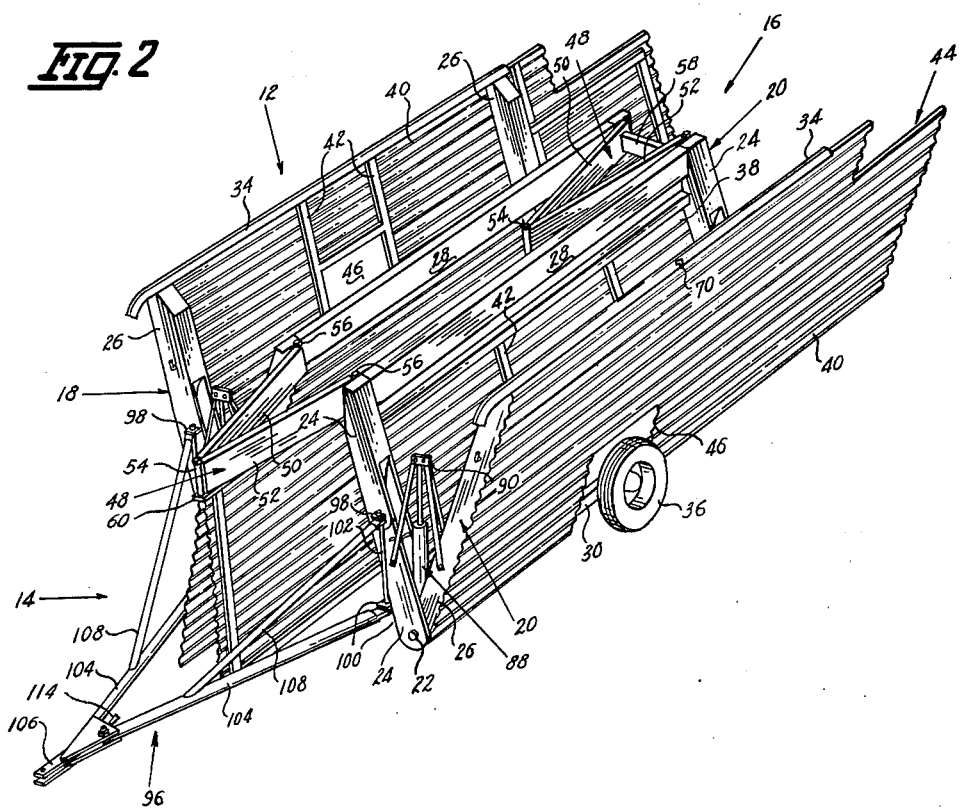

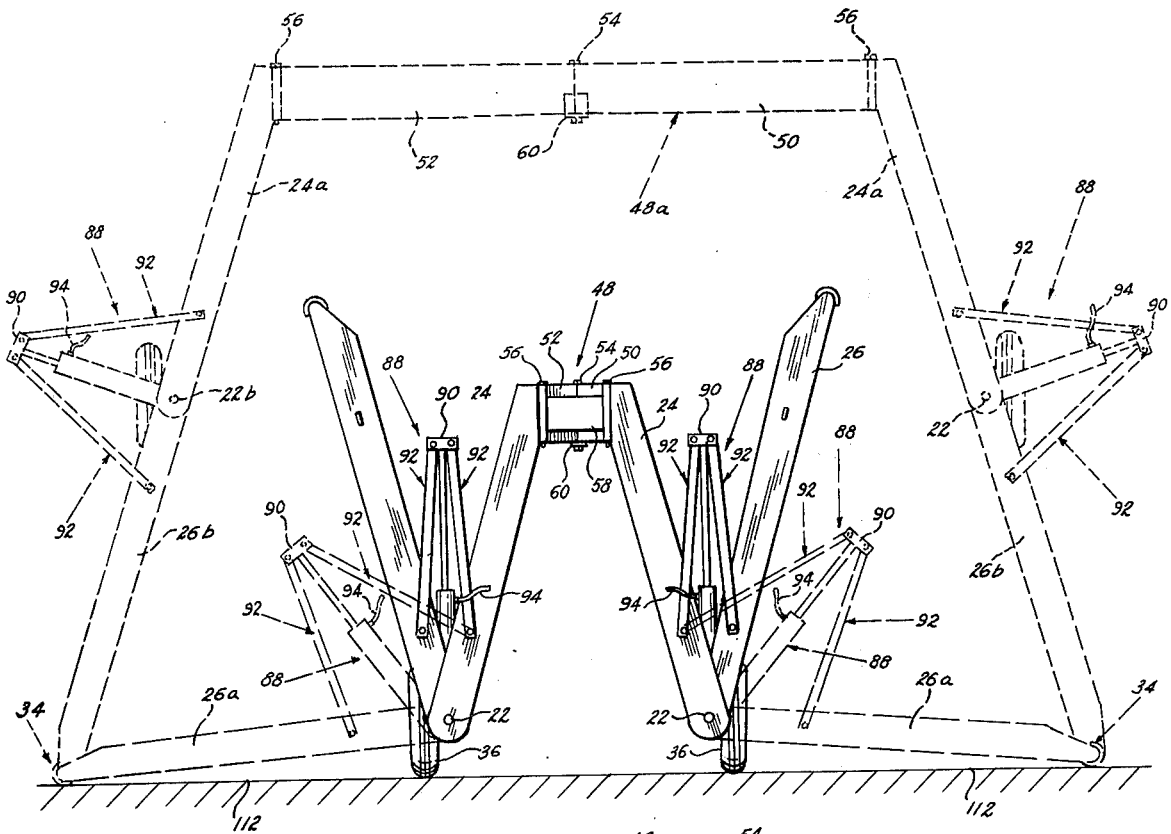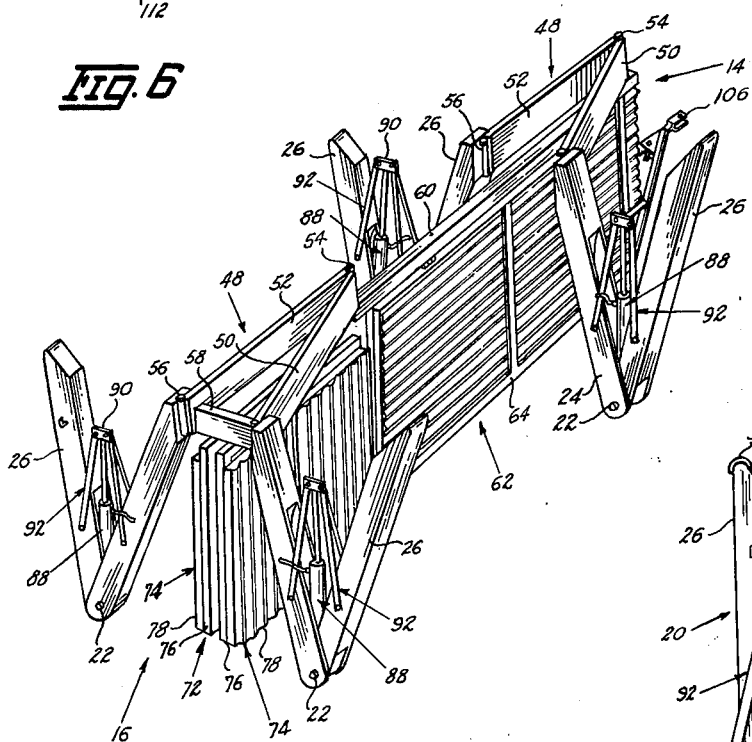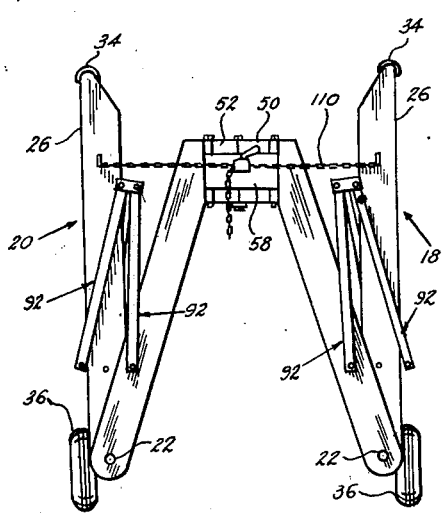

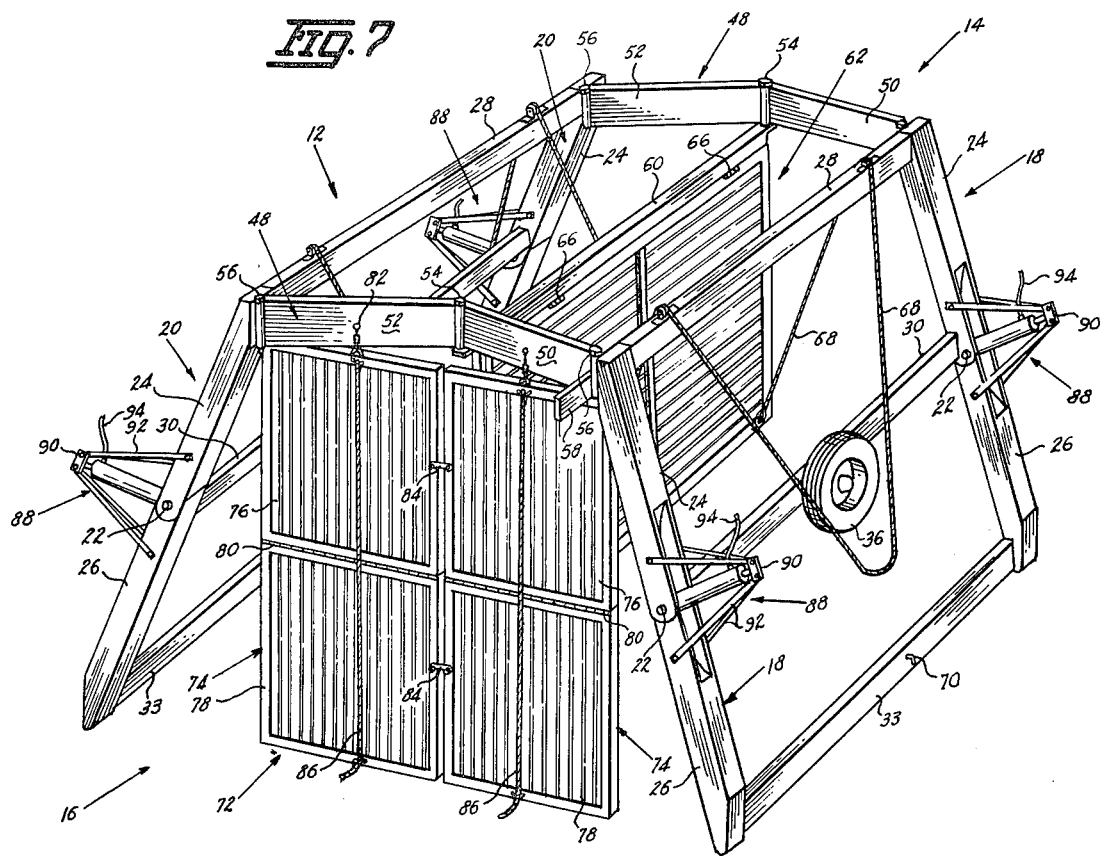
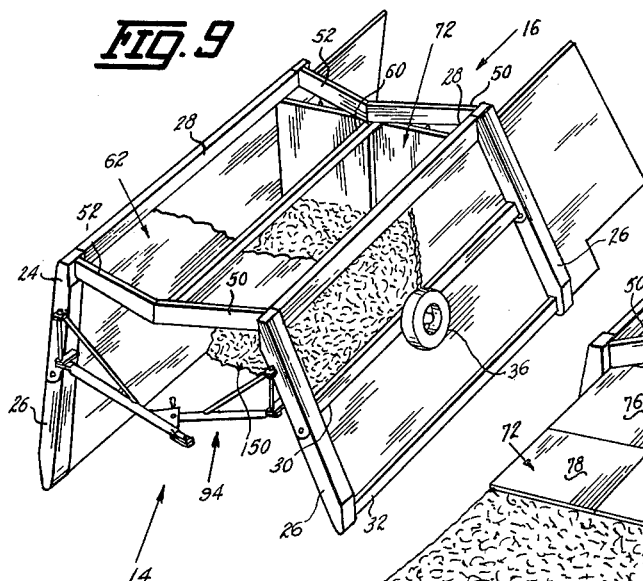
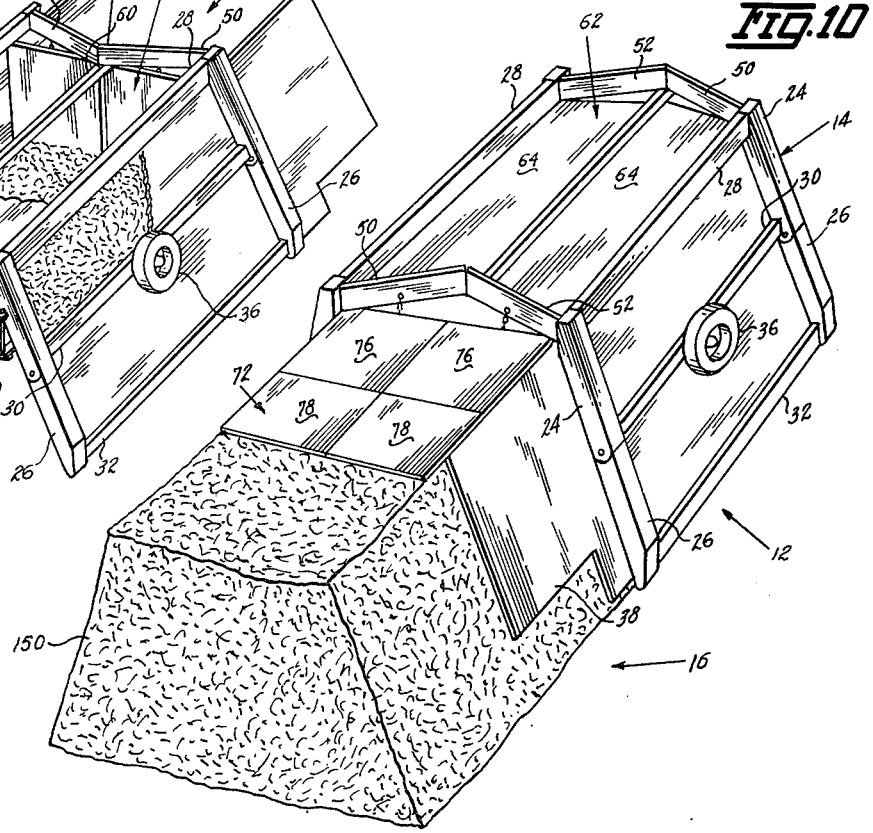

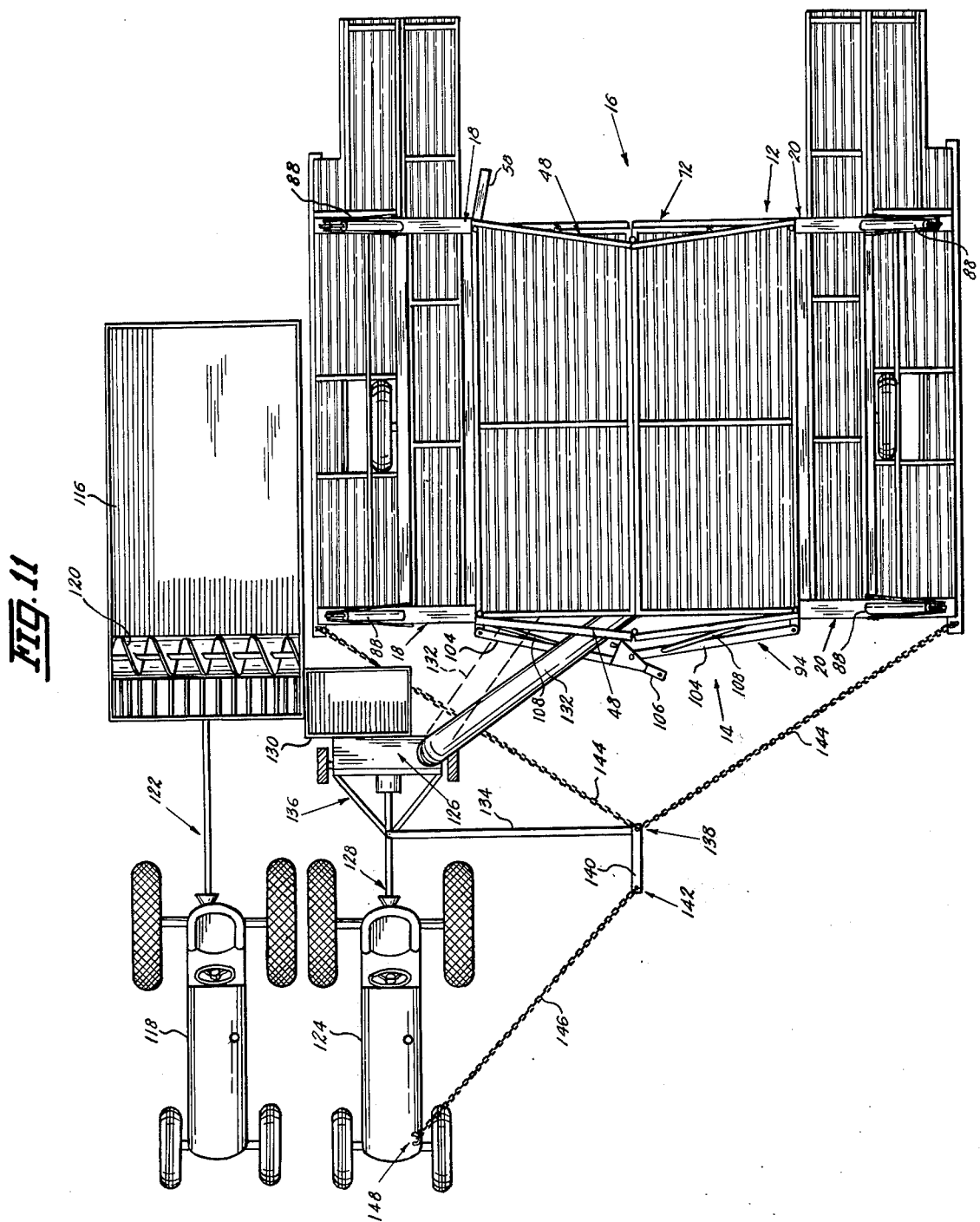

4,024,967

STACK FORMER

BACKGROUND OF THE INVENTION

This invention relates to a partially enclosed towable frame structure for receiving blown silage and causing it to be stacked on the ground in a predetermined uniform shape conducive to its preservation and more particularly is an improvement over a similar device disclosed in my U.S. Pat. No. 3,837,506 by providing novel means for compactly folding the frame under hydraulic power for road travel and hydraulically expanding the frame for stack forming operations.

The value of ensilaging roughage materials to preserve the food value therein for animal feeds has long been recognized and practiced by the use of silos, pits or trenches and stacking on the surface of the ground. It is essential that the silage be sealed from the air as is well known and the storage in silos makes it possible to do this efficiently. However, when available silos are filled or in those situations where there may be no silos available, resort is had to the pit or surface stacking methods indicated. For this purpose, the silage, when it is cut, is loaded into forage wagons which are hauled to the stacking area, unloaded into a blower and blown into a stack formation. My U.S. Pat. No. 3,857,506, using a towable frame with a top, sides, open bottom and ends and a depending swingable baffle, discloses an efficient approach to surface stacking but it has been determined that even though the outwardly sloping sides of this prior device can be drawn in to a vertical position for road travel, the overall size and bulk thereof remains relatively substantial and that a material reduction in size for purposes of transportation and storage would have many advantages.

Accordingly, it is one of the important objects of the present invention to provide a towable silage stack forming device utilizing the principle of a closed top, closed outwardly sloping sides, open bottom and ends and a depending baffle to intercept blown silage as disclosed in my U.S. Pat. No. 3,837,506 but including improvements in the frame structure in the way of novel folding capabilities whereby the frame can be expanded to a relatively substantial size for stack forming purposes and retracted to a substantially reduced size as to width and height for road travel or storage.

More particularly, it is an object herein to provide a stack former of the above class which includes a rigid frame having a plurality of pivotally and hingedly connected components designed to fold and expand in a predetermined manner by means of hydraulically operated jacks.

A further object of the present invention is to provide a stack former as characterized which includes separate frame supported top and baffle elements each individually foldable for changing from a large operating size to a reduced size for transportation and storage and each manually adjustable by suitable cable controls.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective front view of this stack former shown in open or expanded operating position, FIG. 2 is a perspective front view thereof showing the closed or retracted position.

FIG. 5 is an end elevational view showing the frame in closed or retracted position in solid lines and in broken lines showing portions of the frame in the first position of being expanded when they are generally horizontal to the ground and secondly, in broken lines illustrating the full open or extended position of the frame sides and top components, FIG. 6 is a perspective view illustrating the closed position of the two like pivotally and hingedly connected end frame components with certain of the side rails and closed side panels removed to show the location of the roof and baffle elements in the closed position of the frame, FIG. 7 is a rear perspective view similar to FIG. 3 but with the side panels removed to more clearly illustrate the depending baffle in open or extended position and showing the roof or top component still in folded position but ready to be elevated to the position shown in FIG. 3, FIG. 8 is an end elevational view showing the frame closed to its most retracted position for road travel, FIG. 9 is a reduced front perspective schematic view showing the stack former in expanded position and illustrating the beginning of an accumulation of silage forwardly of the baffle, FIG. 10 is a reduced rear perspective schematic view to illustrate the stack fully started and the former having been moved forwardly, and FIG. 11 is a top plan view showing the position of this stack former in use relative to a tractor hitched to both a blower unit and the former and a forage wagon hitched to a tractor as the forage supply source to be stacked.

DESCRIPTION OF THE PREFERRED EMBODIMENTS

Figure 3:
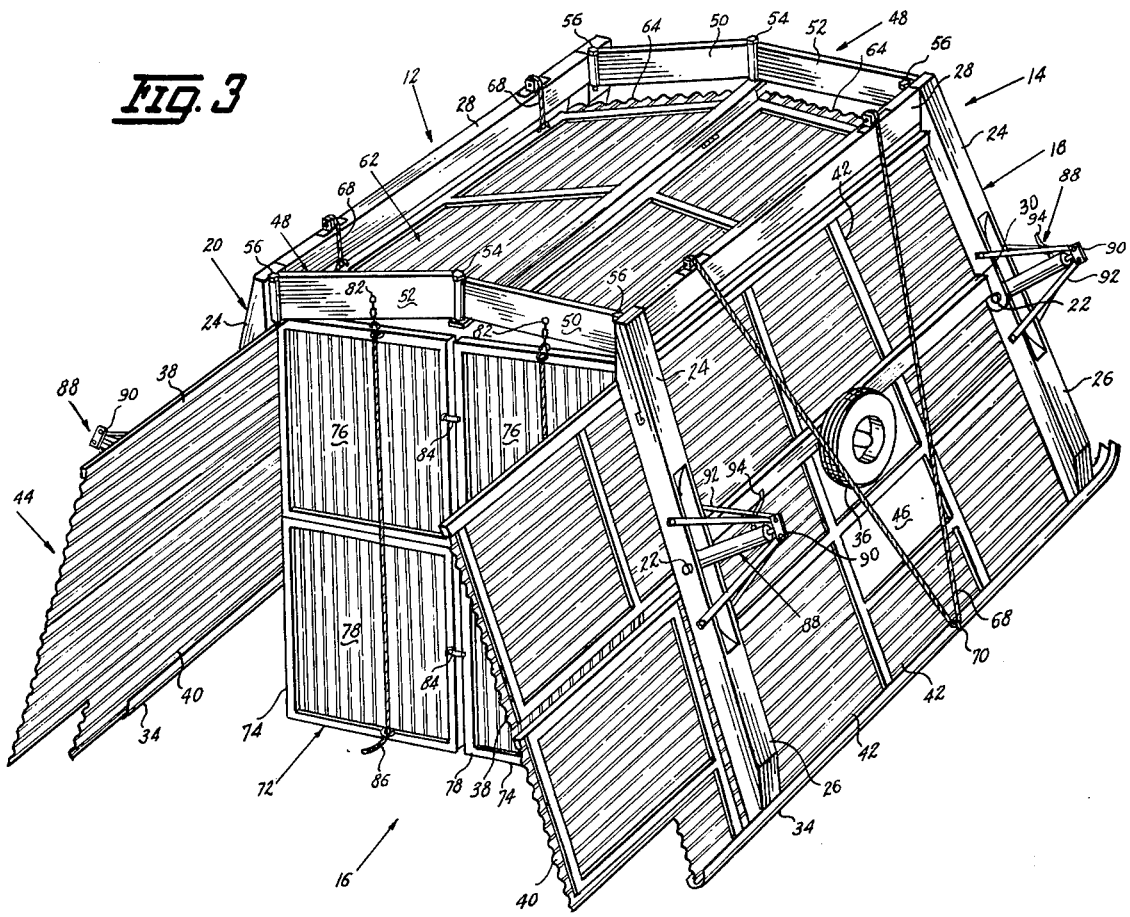
FIG. 3 is a perspective rear view of the expanded operating position of this invention.
Figure 4:
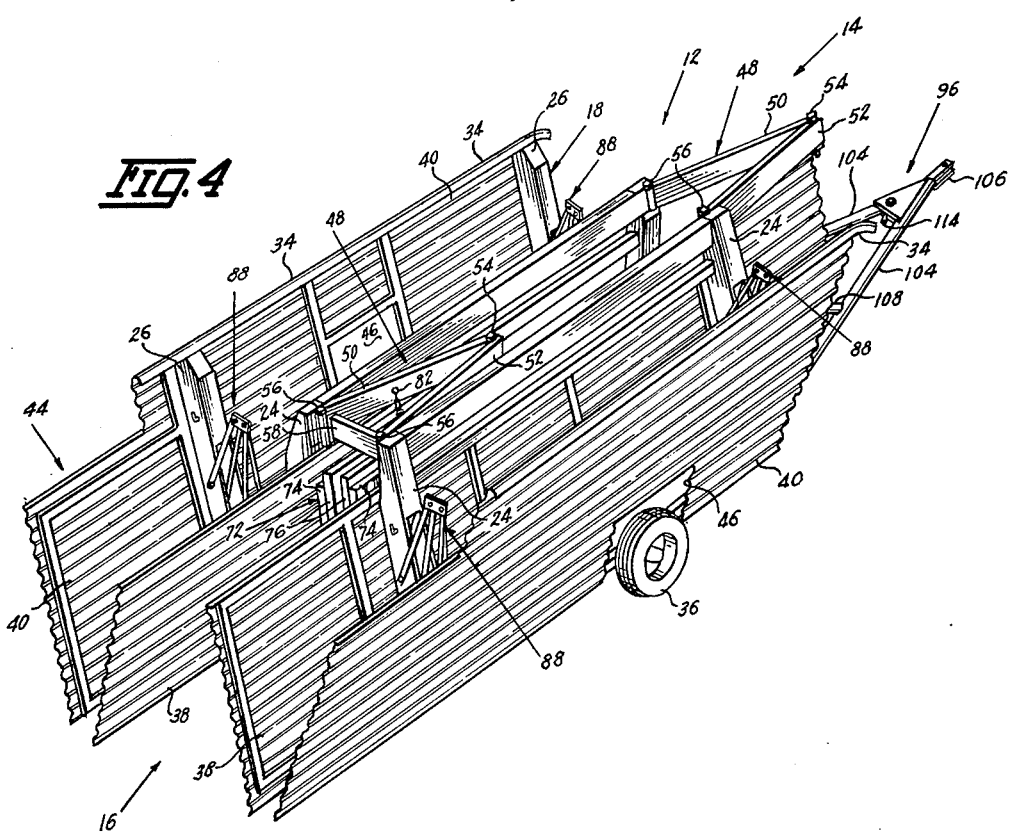
FIG. 4 is a perspective rear view of the closed or retracted position thereof.

Referring to the drawings, this stack former is designated generally by the numeral 12 for wich the more important features reside in the folding capabilities of a relatively strong and massive frame structure illustrated in open or extended position in FIGS. 1, 3 and 7 and in closed or retracted position in FIGS. 2, 4 and 6 and which, for purposes of description, include the front end 14 and the rear end 16.

Former 12 includes the two heavy metal side frame structures 18 and 20 which are of like construction so that like parts will be given like numerals. The forward and rear frame components of structures 18 and 20 comprise two elongated rigid bars pivotally connected in endwise alignment as at 22 to form, for purposes of description, the upper end frame sections 24 and the lower end frame sections 26. The upper ends of the upper frame sections 24 are connected by the rigid top rail 28 and the lower ends of the upper sections are connected by the rigid rail 30 parallel to rail 28. A third rigid rail 32, parallel to rails 28 and 30, connects the extended ends of the lower end frame sections 26 as best seen in FIG. 7 and such third rail carries an elongated skid 34 as seen in FIGS. 1 and 3. A road wheel 36 is suitably mounted to rail 30 substantially at the longitudinal center thereof and thus far described, it will be seen that each of the side frame structures 18 and 20 comprise two sections of which an upper section is defined by end members 24 and rails 28 and 30 and a lower section defined by end members 26 and rail 32 whereby due to the pivotal connection 22, said frame sections, as will later appear more in detail, are capable of a folding movement so they are substantially planar when extended (FIGS. 1, 3 and 7) and when folded by the movement of skid 34 upwardly and toward rail 28 assume a V-shape relationship as seen in FIGS. 2, 6 and 8. It is desirable that the side structures 18 and 20 be suitable for confining the accumulation of silage as will appear and this may be done in any suitable manner as illustrated here where I have used a corrugated sheet metal panel 38 for the upper frame sections and a like panel 40 for the lower sections which are suitably secured to the inner sides of end frame members 24 and 26 such as by framing 42 and which extend rearwardly as at 44. The lower panel 40 is provided with a cutout 46 for registration with wheel 36 as shown.

Sides 18 and 20 are in opposed spaced relationship to each other and the respective upper ends of the upper end sections 24 at both the front and rear ends 14 and 16 are connected in a novel manner by the like constructed top bar assemblies 48 as follows. Assemblies 48 comprise two like rigid bar lengths 50 and 52 hingedly connected as at 54 in endwise relationship defining their inner ends to form a center fold point as shown and hingedly connected at their respective outer ends as at 56 to the respective opposed upper ends of the upper frame end sections 24. Both assemblies 48 are hinged so that as sections 50 and 52 move toward each other as will later appear, the hinge point 54 moves toward the front end 14 as best seen in FIG. 6. On assembly 48 at the rear end 16 (FIG. 6), a stop block 58 is secured to one of the assembly sections 50 or 52, here shown as 50, near the hinge point 56 so as to project perpendicularly toward the opposed assembly section and designed to abut the same in folded position to maintain hinge points 56 in a spaced relationship for reasons which will become apparent as this description proceeds.

A roof or top support bar or beam 60 extends between assemblies 48 and is secured at respective ends to the bottom ends of the respective hinge 54 members so that bar 60 moves longitudinally forwardly and rearwardly with the closing and opening of assemblies 48. Bar 60 serves as the support for the foldable roof or top component designated generally by the numeral 62 and which comprises two separate like panel sections 64 of any suitable type for which I have used rectangular wooden frames covered with corrugated sheet metal. Sections 64 are hingedly attached as at 66 along one longitudinal edge to respective opposite sides of bar 60 so as to depend therefrom in juxtaposition (FIGS. 6 and 7) representing their closed or folded position and from which position such sections can be quickly and easily manually elevated to operating position (FIGS. 1 and 3) by the cable arrangement 68 as shown, said cable end being anchored as at 70 (FIGS. 1 and 7) to maintain sections 64 in operating position.

A baffle assembly 72 is disposed for use at the rear 16 of former 12 as best seen in FIGS. 3 and 7 and comprises two like rectangular corrugated frame units 74 each consisting of upper 76 and lower 78 substantially square sections hingedly secured together as at 80. Sections 74 are disposed side by side with each upper section 76 swively depending 82 from one of the bars 50, 52 in assembly 48. When baffle assembly 72 is opened (FIG. 7), sections 74 are latched together as at 84 so that a baffle of substantial size is provided and yet can be materially reduced in size by unfastening latches 84, folding sections 78 up against sections 76 and placing the folded sections in juxtaposition as seen in FIG. 7. To aid in folding sections 78 and in conveniently lowering them when desired, I provide a simple hand operable cable or cord means 86 as best seen in FIG. 7. Thus far described, it will be appreciated that both the roof component 62 and the baffle assembly 72 are conveniently arranged within the frame structure of former 12 for quick and easy accessibility as to operating or storage positions.

The movement of the several frame components in the expansion and retraction of former 12 as will be later described in more detail, is provided by four like two-way acting hydraulic jacks 88 with two such jacks mounted on each side frame structure 18 and 20. For this purpose, the closed cylinder end of each respective jack 88 is suitably secured to the lower end of a respective frame side 24 so that the plunger rod end extends generally perpendicularly therefrom as shown. The out end of each plunger rod on each jack 88 is provided with a suitable fitting 90 to the opposite sides of which are pivotally attached one end of a respective pair of elongated rigid links 92. The other end of one pair of links 92 is pivotally attached in a straddle relationship to side end frame member 24 and the other end of the other pair of links 92 is similarly attached to the side end frame member 26, such attachments to members 24 and 26 being substantially midway between pivot point 22 and the longitudinal center of the respective members 24 and 26 as shown. Appropriate hose lines 94 on jacks 88 will be connected in a well known manner to a source of hydraulic power on a towing vehicle as will appear.

For purposes of towing former 12 in road travel or the like when it is in folded or retracted position, I provide a foldable tongue assembly 96 as best seen in FIGS. 1 and 2. Such assembly 96 includes a pair of brackets 98 secured respectively to end frame members 24 at the front end 14 midway between pivot point 22 and the upper ends of members 24. A second set of similar brackets 100 are secured to the respective ends 24 below brackets 98 and the two respective sets of brackets on each member 24 are connected by a respective rigid rod 102. A pair of tongue rods 104 are each pivotally connected at one end to a hitch fitting 106 and similarly connected at their other respective ends to the respective brackets 100. A pair of brace rods 108 are pivotally connected to one end to respective brackets 98 and are secured at their other ends to the respective tongue rods 104 and thus arranged, tongue assembly 96 will extend forwardly for road travel as seen in FIG. 2 and will fold rearwardly across former end 14 during field use.

OPERATION

The field use of former 12 is not dissimilar from the stack former disclosed in my U.S. Pat. No. 3,837,506 and will be described in general later as the more important feature of the present invention resides in the folding capabilities of the overall frame structure which, when constructed according to the foregoing description, will operate as follows.

The folded or retracted position of former 12 for towing in road travel or the like is shown in FIGS. 2 and 4 and further, for illustration, the retracted position of the major frame components are shown in FIG. 6 and in the solid line showing of FIG. 5. In this position, it will be seen that the plunger rods on jacks 88 are fully extended whereby side members 26 are in a generally upward position forming a V-shape with members 24 so that pivot point 22 defines the bottom plane and wheels 36 on bars 30 are in ground engaging position. The folding up of members 26, of course, carries the panels 40 and cutout 46 provides clearance relative to the wheels 36 as shown and at the same time, tongue assembly 96 extends forwardly as seen in FIG. 2. While the folded position seen in FIG. 2, 4 and 6 can be maintained by hydraulic power to jacks 88, it is possible, if desired, to further reduce the overall folded width as seen in FIG. 8 where a suitable adjustable strong chain means 110 can be connected between opposed members 26 and then the links 92 connected to members 26 can be disconnected therefrom. With the jacks 88 thus released from members 26, chain 110 can be tightened to draw members 26 substantially vertical as shown. Also in the folded position of former 12, top assemblies 48 are folded and extend forwardly as seen in FIG. 6 with the top or roof section 64 and the baffle assembly 72 being in a compact hanging position within the confines of the folded frame as previously described and thus former 12 is less than eight feet in height and width when fully folded for road travel.

In manipulating former 12 from its closed position shown in FIG. 2 to its open or expanded position shown in FIG. 1, reference is made to FIG. 5 where the closed frame position is shown in solid lines. Here, with power applied to jacks 88, the plunger rods begin to retract whereby frame ends 26 move outwardly and downwardly to the position indicated 26a where skids 34 engage the ground 112 and the angle between members 24 and 26a is slightly more than ninety degrees. In this position, with wheels 36 still engaging the ground 112 and serving as a fulcrum, the continued retraction of the plunger rods on jacks 88 pulls the pivot point 22 upwardly and outwardly over center whereby members 24 move away from each other to open top assembly 48 and the substantially full retraction of jacks 88 establishes the open position shown at 26b, 24a and 48a in FIG. 5 and further shown in FIGS. 1 and 3 where it is seen wheels 36 have moved to a substantially midway vertical position on the expanded sides where they are no longer in contact with the ground. During such frame movement, tongue assembly 96 will have been drawn in to the position shown in FIG. 1 and preferably, a hitch lock 114 is applied to prevent any accidental folding movement when former 12 is pulled forwardly as will appear. In the open position thus established, former 12 is approximately 10 feet high, 10 feet wide at the top and about 19½ feet between skids 34 at ground level. Once former 12 is expanded as described, the roof assembly 62 and the baffle assembly 72 are manually put in place as previously disclosed.

It will be understood that former 12 in its folded position can be towed by any suitable prime mover to a point of use at which time it is expanded and will be used with other equipment in the formation of a forage stack as follows.

A forage weapon 116 pulled by a tractor 118 will have been loaded in the field with the forage and brought to the site for stacking. Such equipment as 116 and 118 is generally available on farms or readily obtainable and wagon 116 is a common type which includes a forage discharge means such as the screw auger 120 connected to the power take-off 122 of tractor 118 in a well known manner. Alongside tractor 118 is a second tractor 124 to which is hitched a conventional type blower unit 126 operated by the power take-off 128 and includes a hopper 130 disposed alongside wagon 116 to receive the forage discharged whereby the forage is impelled by the blower 126 through spout 132 that has means for oscillation between the solid and broken line positions as shown.

Former 12, as seen in FIG. 11, is generally in an alongside position relative to wagon 116 although the front 14 of former 12 is spaced rearwardly of the hopper 130 so that the discharge end of spout 132 can be oriented to the interior of former 12. Thus far described, it will be seen from FIG. 11 that because of the necessity to position blower 126 adjacent the auger end 120 of wagon 116 and due to the width of former 12, the hitch point between tractor 124 and former 12 is offset from a normal direct alignment so that I have, accordingly, provided for such attachment as follows.

A rigid drawbar 134 is secured at one end to the tongue element 136 of blower 126 and extends parallel to the front 14 of former 12 to point 138 which is in line with the longitudinal center axis of former 12 and from which a short hitch bar 140 extends forwardly to point 142. A draw chain 144 is connected at respective ends to the respective leading skid 34 ends at front 14 and at its center to point 138 of drawbar 134. A second draw chain 146 connects between point 142 on bar 140 to the left forward end of tractor 124 at point 148. It should be noted that in the normal use of former 12, it is not anticipated that any relatively long distances of travel will be involved while former 12 is expanded and, accordingly, skids 34 have been used which are considerably more economical than a second set of wheels and thus it will be appreciated that, if desired, wheels may be substituted for skids 34 without changing the purpose and functioning of this invention.

In starting the forage stack, baffle assembly 72 will be unfolded to its enlarged position and will initially depend in a vertical plane to in effect provide a temporary back wall in former 12 and as forage is delivered from wagon 116 to blower 126 and discharged through spout 132, it is intercepted by baffle assembly 72 whereby the stack begins to accumulate directly on the ground as represented by the numeral 150 in FIG. 9. Such accumulation continues with the size and shape of the stack determined by the interior configuration of former 12 providing for a top narrower than the bottom and the sloping sides as shown.

When the area within former 12 forwardly of baffle assembly 72 has been sufficiently filled, former 12 is pulled slowly forwardly by tractor 124 whereby baffle assembly 72 swings upwardly to ride over the stack 150 as seen in FIG. 10 until it is substantially folded again top 62 but resting on the top of the stack and contributing to packing the same although such stack will be generally well packed if the blower 126 has suitable power. In the moving of former 12 forwardly, the more or less off-center hitch connection arrangement provides a most satisfactory means of maintaining the former 12 in proper travel alignment. As former 12 is successively filled and moved, the stack 150 will emerge as seen in FIG. 10 and may be continued for any length desired or may be discontinued at any point and restarted at a new position.

Former 12 as thus shown and described, provides a most efficient means for creating a relative large forage stack of uniform size and of any desired length and yet the size of the former 12 can be quickly and easily varied from its relatively tall and wide operating shape to a substantially reduced narrow width and short height convenient for road travel and through standard vehicle gates without difficulty and without posing a hazard to traffic. Accordingly, from all of the foregoing, it is thought a full understanding of the construction and operation of this invention will be had the advantages thereof appreciated.

I claim:

1. In an apparatus of the type to receive a stream of forcibly propelled forage and to constrain the same into an accumulated mass or form at a selected location and in a predetermined configuration, a relatively massive foldable stack forming frame, comprising:
a pair of like opposed generally rectangular side frame structures having front and rear ends and having respective upper and lower sections pivotally connected so that said lower sections are capable of folding toward and away from said upper sections,
a respective top assembly including like opposed bar lengths having outer ends hingedly secured respectively to opposed front and rear ends of said upper sections and having inner ends hingedly connected together for folding movement of said bar lengths towards each other into a compact V position and away from each other to a substantially planar position,
a support bar connected between the inner end hinge points of said top assembly bar lengths,
a wheel mounted to each upper section adjacent the corresponding lower section,
a skid on the outer end of each lower section,
a respective hydraulic jack mounted to the front and rear ends of each side frame structure and operably connected to said upper and lower sections for effecting folding movement of said sections relative to each other,
a hitch means secured to the front end of said side frame structures,
said jacks being connectible to a source of hydraulic power wherein the extension of said jacks effect the closed or folded position by elevating said lower sections to a V-shaped relationship with said upper sections causing said wheels to become engaged with the ground and at the same time moving said upper sections towards each other causing the bar lengths of the top assembly to fold together at their hinge connection, and
the retraction of said jacks effecting the open or expanded position for stack forming operation by moving said lower sections outwardly and downwardly from said upper sections until said skids are in ground engagement and the angle between said sections is greater than 90° so that said wheels serve as a fulcrum as operation of the jacks moves the pivot point between the upper and lower sections over center and said upper sections rise and move away from each other causing the bar lengths on the top assembly to be elevated and opened to a transverse position between the side frame structures and wherein the wheels are elevated from ground level as the upper and lower sections become planar on an inclined plane outwardly and downwardly from their topmost point to ground level.

2. Apparatus as defined in claim 1 including a laterally extending stop bar on the rear end of one of said upper sections whereby in the closed position of said frame structure, said stop bar abuts the opposed side frame structure to maintain a predetermined spaced relationship between the top assembly bar lengths at such point.

3. Apparatus as defined in claim 1 including:
a pair of like roof or top panel sections each hingedly secured along one side to respective opposite sides of said support bar so that they depend therefrom in juxtaposition defining their closed position relative to the closed position of said stack forming frame,
manually operable cable means operably connected to the depending ends of said panel sections and said side frame structures for elevating said panel sections to open or roof forming position, and
cable anchoring means on said side frame structures.

4. Apparatus as defined in claim 1 including:
a baffle assembly including a plurality of like sized panel sections hingedly secured together for folding into a stacked arrangement defining a closed position and for unfolding a planar position to establish a panel of substantial size for open or operation position,
said baffle assembly being swivelly suspended from said top assembly at the rear of said side frame structures so that in the open position of the stack forming frame it can be disposed transversely of the longitudinal axis of said frame to serve as a rear side therefor and in the closed position of said frame and said baffle assembly said assembly can be disposed parallel to the longitudinal axis of said frame, and
latch means on said baffle assembly panel sections for maintaining them in respective open and closed positions.

5. Apparatus as defined in claim 1 including:
respective closed panels on said respective upper and lower sections, and
the panels on said lower sections being provided with suitable cutouts for registration with and clearance of said wheels in the folded position of said stack forming frame.

6. Apparatus as defined in claim 1 wherein said hitch means comprises:
a hitch member, and
a pair of tongue rods each pivotally connect at corresponding ends to a respective side frame structure at the front ends thereof and extending forwardly therefrom in a converging relationship with their other ends pivotally attached to said hitch member whereby in the open position of said stack forming frame said hitch member moves rearwardly and said tongue rods extend generally transversely between said side frame structures and in the closed position of said stack forming frame said tongue rods extend forwardly in a converging relationship to extend said hitch member for attachment to a prime mover.

7. Apparatus as defined in claim 1 including:
adjustable cable means operably connected between said lower sections when in folded position, and
with said jacks disconnected from said lower sections said cable means operable to further draw and hold said sections closer towards each other in reducing the folded width dimension of said stack forming frame.

8. Apparatus as defined in claim 1 wherein said stack forming frame is less than 8 feet high and 8 feet wide in folded position and in open position is approximately 10 feet high, 10 feet wide at the top and 19½ feet wide at ground level.

9. Apparatus as defined in claim 1 wherein said side frame structures include:

the front and rear ends of said side frame structures each comprising two rigid bar lengths pivotally connected in endwise relationship to define respective upper and lower end sections capable of being moved into planar and V-shaped relationships, a respective top and bottom rail connecting the respective extended ends of the upper and lower end sections and an intermediate rail connected between the lower end portion of the upper end sections whereby each side frame structure includes a lower side section capable of folding toward and away from an upper side section, a respective wheel mounted to said intermediate rail on each side frame structure, and an elongated skid mounted to the extended end of each lower side section.

10. Apparatus as defined in claim 1 wherein said jacks include:

a respective two way hydraulic jack mounted to each upper section near the pivot point thereon so that the plunger rod component extends substantially perpendicularly therefrom, a respective first pair of rigid links connecting the plunger rod end of said jack to a lower end section in a straddle relationship, and a respective second pair of rigid links similarly conconected to each respective upper end section.

* * * * *